(12) United States Patent
Battaglia et al.

(10) Patent No.: US 10,823,353 B1
(45) Date of Patent: Nov. 3, 2020

(54) MULTIFUNCTION LIGHTING UNIT

(71) Applicant: Zoox, Inc., Foster City, CA (US)

(72) Inventors: Nahuel Elias Battaglia, Stanford, CA (US); Chang Gi Samuel Hong, San Francisco, CA (US); Timothy David Kentley-Klay, Stanford, CA (US); Christopher John Stoffel, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/408,395

(22) Filed: May 9, 2019

(51) Int. Cl.
| | | |
|---|---|---|
| *B60Q 1/14* | (2006.01) | |
| *F21S 41/47* | (2018.01) | |
| *F21S 41/141* | (2018.01) | |
| *F21S 43/14* | (2018.01) | |
| *F21S 41/30* | (2018.01) | |
| *B60Q 1/34* | (2006.01) | |
| *F21S 43/20* | (2018.01) | |
| *B60Q 1/04* | (2006.01) | |
| *B60Q 1/44* | (2006.01) | |
| *F21S 41/25* | (2018.01) | |

(52) U.S. Cl.
CPC .............. *F21S 41/141* (2018.01); *B60Q 1/04* (2013.01); *B60Q 1/34* (2013.01); *B60Q 1/44* (2013.01); *F21S 41/25* (2018.01); *F21S 41/30* (2018.01); *F21S 43/14* (2018.01); *F21S 43/20* (2018.01)

(58) Field of Classification Search
CPC .......... F21S 41/141; F21S 41/25; F21S 43/20; F21S 43/14; F21S 41/30; B60Q 1/04; B60Q 1/44; B60Q 1/34
See application file for complete search history.

(56) References Cited

U.S. PATENT DOCUMENTS

2019/0162382 A1 * 5/2019 Kang ................. F21S 41/68
2019/0359118 A1 * 11/2019 Spenner .............. B60Q 1/076

* cited by examiner

*Primary Examiner* — Tracie Y Green
(74) *Attorney, Agent, or Firm* — Lee & Hayes, P.C.

(57) ABSTRACT

A lighting system of a vehicle may include light units and controllers for operating the light units. Each light unit is multifunctional in that the light unit may operate in various modes, which may be invoked at different times under varying circumstances. A light unit on the first end of a vehicle may operate as a headlight if the first end is the front end of the vehicle. On the other hand, the light unit may operate as a tail light if the first end is the rear end of the vehicle. Furthermore, the light unit may operate as a turn signal in either direction or brake light while the first end is the rear end of the vehicle. The light unit includes a lens array positioned to receive light from various light sources. The lighting system may operate in a fashion that allows for lighting redundancy on each end of the vehicle in the event of a lighting controller failure.

20 Claims, 6 Drawing Sheets

MULTIFUNCTION LIGHTING UNIT

BACKGROUND

Vehicles typically have multiple different types of lights to illuminate the exterior and/or interior of the vehicle. For example, vehicles commonly include headlights, a tail lights, turn signal lights, reverse lights, and a dome light. In general, exterior lights may be used to illuminate at least a portion of an environment around the vehicle, to increase a visibility of the vehicle to others in the environment, and/or to provide a signal function to visually convey an action to be taken by a driver (e.g., braking, turning, reversing, etc.). Interior lights may illuminate at least a portion of an interior of the vehicle to allow occupants to view the interior of the vehicle. Each type of conventional vehicle light is specially configured to perform a specific function. For instance, conventional headlights are specially configured to irradiate light to a front side of the vehicle to secure a visual field of a driver, while conventional brake lights are specially configured to emit light from a rear of the vehicle when a driver activates a brake pedal of the vehicle. Conventional headlights are not suitable for use as brake lights, and vice versa.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
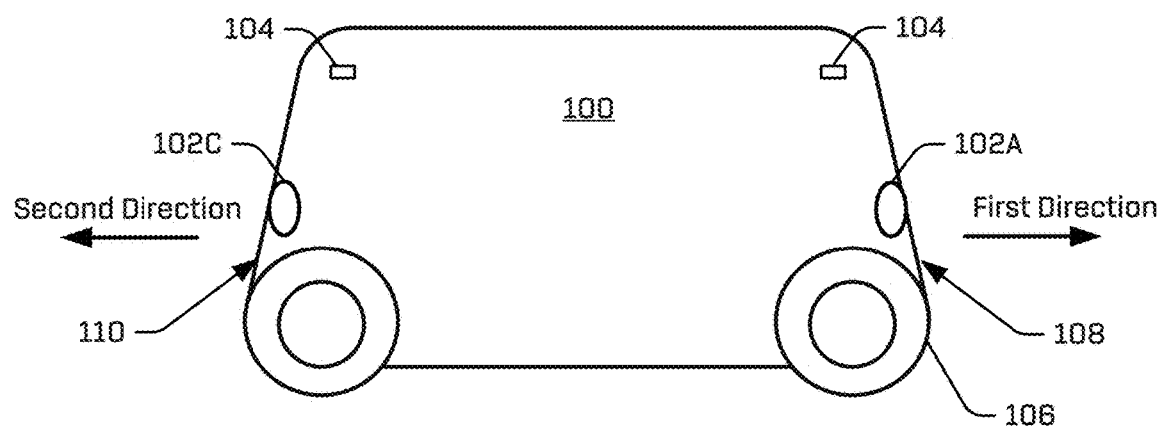
FIG. 1 is a schematic side view of an example vehicle with various light units.

This disclosure relates to light units, a lighting system, and techniques for controlling a lighting system of a vehicle. The lighting system includes one or more light units and one or more controllers for operating the light units.

Each of the light units of the lighting system may perform among a plurality of lighting functions (whether required by law or not), which may comprise, among other things, a headlight or a tail light for the vehicle, turn signals, reverse lights, brake lights, high-beams, fogs, and the like. In other words, such a light unit is multifunctional in that the light unit may operate in multiple modes, which may be invoked at different times under varying circumstances. For example, a light unit on the first end of a vehicle may operate as a headlight when the first end is the front end of the vehicle. On the other hand, the light unit may operate as a tail light when the first end is the rear end of the vehicle. Furthermore, the light unit may operate as a rear turn signal or brake light when the first end is the rear end of the vehicle.

In some implementations, the light unit includes a lens array positioned to receive light from various light sources. For example, a first light source may be a white light source and a second light source may be a red light source. Such light sources may be semiconductor light sources such as light emitting diodes (LEDs). Different portions of the lens array may be positioned to receive light from respective light sources. For example, a first portion of the lens array may be positioned to receive white light from one or more white light LEDs, and a second portion of the lens array may be positioned to receive red light from one or more red light LEDs. The first portion of the lens array may comprise lenslets (e.g., small lenses) that collimate portions of the light (e.g., the white light) toward the exterior of the vehicle to serve as backup (or reverse) lights, for example. The second portion of the lens array may comprise lenslets that collimate the red light toward the exterior of the vehicle to serve as brake lights, for example.

In at least some examples, the vehicle comprises a first end and a second end that is opposite the first end. In a first direction of travel, the first end may be the leading or front end of the vehicle and the second end may be the trailing or rear end of the vehicle. In a second direction of travel, opposite the first direction, the second end may be the leading or front end of the vehicle and the first end may be the trailing or rear end of the vehicle. In various embodiments, a lighting system of the vehicle may be configured to operate in a fashion that allows for lighting redundancy on each end of the vehicle. For example, a first controller may operate a light unit on each end of the vehicle and a second controller may operate other light units on each end of the vehicle. Thus, if one of the controllers fails to properly operate its respective light units, the other (properly functioning) controller can continue to operate so that at least one light unit on each end of the vehicle remains operable. Accordingly, safety of the vehicle is improved since both ends of the vehicle are visible via the operable light units and are able to perform the minimum number of required lighting indications for street operations (e.g., braking, headlamps, turn signals, and the like).

For example, such a lighting system may include a first light unit on the first end of the vehicle, a second light unit on the first end of the vehicle, a third light unit on a second end of the vehicle, and a fourth light unit on the second end of the vehicle. The lighting system may further include a first controller configured to operate the first and the third light units. Moreover, the lighting system may include a second controller configured to operate the second and fourth light units. For example, the first controller may be communicatively coupled to the first light units and the second controller may be communicatively coupled to the second light units. In an example situation, in response to a failure of the first light controller to properly operate, the second light controller may be configured to operate the second light unit on the first end of the vehicle to function as the headlight while operating the fourth light unit on the second end of the vehicle to function as the tail light. Moreover, in responsive to a failure of the second light controller to properly operate, the first light controller may be configured to operate the first light unit on the first end of the vehicle to function as the headlight while operating the third light unit on the second end of the vehicle to function as the tail light. In such situations, the vehicle may continue travelling so that the first end of the vehicle is the leading end or, alternatively, the vehicle may reverse direction so that the vehicle is travelling so that the first end of the vehicle is the leading end. In either case, lighting redundancy on each end of the vehicle allows for a headlight and a tail light to be operable on either end of the vehicle.

As described above, the light units may be multifunctional in that each of the light units may operate in various modes, which may be invoked at different times under varying circumstances. Accordingly, each of the first and second controllers may be configured to operate their respective light units to operate in any of the various modes. For example, the first controller may be configured to operate the first light unit on the first end of the vehicle to function as the headlight while operating the third light unit on the second end of the vehicle to function as the tail light. Simultaneously, if both controllers are properly functioning, the second controller is configured to operate the second light unit on the first end of the vehicle to function as the headlight while operating the fourth light unit on the second end of the vehicle to function as the tail light. As indicated above, if one of the controllers is not functioning properly, the other controller can maintain one headlight and one tail light on each respective end of the vehicle.

By way of example and not limitation, a vehicle, as described herein, may include a body module, a first drive module coupled to a first end of the body module, and a second drive module coupled to a second end of the body module. The body module also includes a vehicle computing device to control operation of the vehicle. A first light controller may be located on the first end of the body module proximate the first drive module and a second light controller may be located on the second end of the body module proximate the second drive module. The first light controller may be physically separated from the second light controller. For example, the first light controller may be disposed closer to the first end of the vehicle than to the second end of the vehicle, and the second light controller may be disposed closer to the second end of the vehicle than to the first end of the vehicle. In other examples, the light controllers may be coupled to or incorporated in the respective drive modules. For instance, the first light controller may be coupled or be part of the first drive module and the second light controller may be coupled to or be part of the second drive module.

Figure 2:
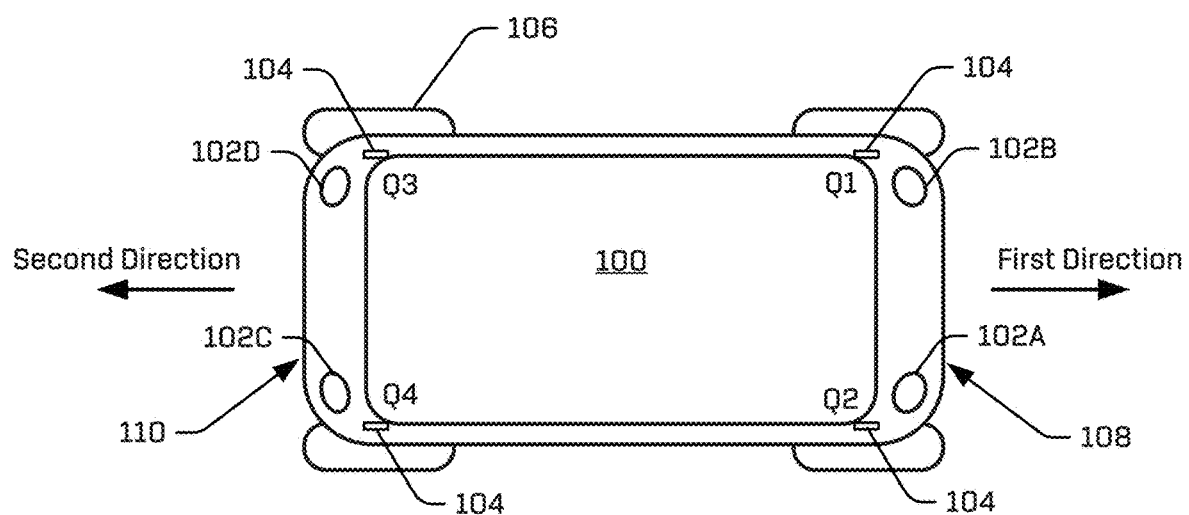
FIG. 2 is a schematic top view of the example vehicle with the various light units.

FIG. 1 is a schematic side view of a vehicle 100 with various light units 102A, 102B, 102C, and 102D (collectively "light units 102"). FIG. 2 is a schematic top view of vehicle 100, which is illustrated to also include various other lighting 104. In other examples, the light units 102A, 102B, 102C, and 102D and/or the other lighting 104 may be located at locations of vehicle 100 other than what is indicated in FIGS. 1 and 2. In some examples, vehicle 100 may be an autonomous vehicle configured to operate according to a Level 5 classification issued in 2016 by the U.S. National Highway Traffic Safety Administration, for example, which describes a vehicle capable of performing all safety-critical functions for an entire trip, with the driver (or occupant) not being expected to control the vehicle at any time. In that case, since the vehicle may be configured to control all functions from start to stop, including all lighting functions, it may be unoccupied. This is merely an example, however, and the systems and methods described herein may be incorporated into any ground-borne vehicle, including those that are manually driven by a human and those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

Vehicle 100, as an example, is an automobile having four wheels/tires 106. Other types and configurations of vehicles are contemplated, such as, for example, vans, sport utility vehicles, crossover vehicles, trucks, buses, agricultural vehicles, and construction vehicles. Vehicle 100 may be powered by one or more internal combustion engines, electric motors powered by one or more power supplies (e.g., batteries, hydrogen fuel cells, etc.), or any combination thereof. In addition, although vehicle 100 is illustrated to have four wheels/tires 106, the systems and methods described herein may be incorporated into vehicles having fewer or a greater number of wheels, tires, and/or tracks. Vehicle 100 has four-wheel steering and may operate generally with equal performance characteristics in all directions, for example, such that a first end 108 of vehicle 100 is the front end of the vehicle when traveling in a first direction, and such that the first end 108 becomes the rear end of the vehicle when traveling in the opposite, second direction, as illustrated in FIGS. 1 and 2. Similarly, a second end 110 of the vehicle is the front end of the vehicle when traveling in the second direction, and the second end 110 becomes the rear end of the vehicle when traveling in the opposite, first direction. These example characteristics may facilitate greater maneuverability, for example, in small spaces or crowded environments, such as parking lots and urban areas. Thus, because of a bi-directionality of vehicle 100, each of light units 102 may operate as a headlight sometimes while operating as a tail light, brake light, turn signal, and so on, at other times.

Portions of vehicle 100 may be identified as quadrant portions Q1, Q2, Q3, and Q4, as illustrated in FIG. 2. Thus, first end 108 includes quadrant portions Q1 and Q2 and second end 110 includes quadrant portions Q3 and Q4.

In some examples, vehicle 100 may include a primary executive motion unit (EMU) (not illustrated in FIGS. 1 and 2) and a secondary EMU connected to various electrical and mechanical components of the vehicle via a suitable communications network (e.g., a controller area network (CAN), or any other suitable wired or wireless communication). The primary EMU and secondary EMU may be redundant and provide redundant signals when operating properly. In other words, both EMUs can have the same functions and capabilities and be capable of independent control of vehicle 100. In some examples, identical input from both EMUs may be used for a particular action to provide a functionality check.

In other examples, the secondary EMU can take a "backup" role and may have reduced functionality and/or complexity in comparison to the primary EMU. Thus, a failure of the primary EMU may trigger a "limp" mode, in which certain functions are deactivated or modified, speed is reduced, and safety thresholds are raised until a repair to the primary EMU can be performed. For example, such functions may involve operation of respective light units on first and second ends of the vehicle. In some examples, the limp mode may reduce the vehicle speed cause the vehicle to perform a safe stop or take some other action.

By way of example and not limitation, vehicle 100, as described herein, may include a body module, a first drive module coupled to a first end of the body module, and a second drive module coupled to a second end of the body module, as described, for example, in U.S. patent application Ser. No. 15/674,688, filed Aug. 11, 2017, entitled "Vehicle with Interchangeable Drive Modules", which is herein incorporated by reference in its entirety. The body module may include a passenger compartment to house one or more passengers. The body module also includes a vehicle computing device to control operation of the vehicle. A first light controller may be coupled or be part of the first drive module and a second light controller may be coupled to or be part of the second drive module. The first light controller may be physically and/or spatially separated from the second light controller. For example, the first light controller may be disposed closer to the first end of the vehicle than to the second end of the vehicle, and the second light controller may be disposed closer to the second end of the vehicle than to the first end of the vehicle.

In some examples, the first drive module and the second drive module are substantially identical, while in other examples they may be different from each other. The first drive module and/or the second drive module in this example include a drive module frame to which are mounted first and second wheels, an electric drive motor, a heating ventilation and air conditioning (HVAC) system, and/or one or more exterior lights. Some exterior lights (e.g., light units and other various lights) may be located on the drive modules. The electric drive motor is coupled to the drive module frame and to the first and second wheels to drive at least one of the first and second wheels. The HVAC system is disposed in or on the drive module frame to provide temperature controlled air to the passenger compartment of the body module via one or more air ducts or connections. A power supply is disposed in the drive module and electrically coupled to the electric drive motor, the HVAC system, and/or the exterior lights to provide power to the electric drive motor, the HVAC system, and/or the exterior lights. The power supply in the drive module may additionally or alternatively supply power to one or more components of the body module, such as the first light controller, second light controller, the vehicle computing device, interior lighting, and/or exterior lighting of the body module. A drive module control system is communicatively coupled, by wired or wireless connection, to the vehicle computing device of the body module. The drive module control system is configured to control operation of the electric drive motor and the HVAC system based at least in part on signals received from the vehicle computing device. The drive module control system may include power systems to power, among other things, the vehicle lights (e.g., interior and/or exterior lights of the drive modules and/or the body module). In some implementations, such power systems are redundant so that if one fails the other will continue to supply power to the lights on both drive modules.

Vehicle 100 may include one or more sensors to sense objects surrounding the vehicle or conditions of the vehicle. These sensors may be located on the body module, the drive modules, or some sensors may be located on the body module while other sensors are located on the drive modules. Examples of sensors that may be included on the body module, the drive modules, or both include, without limitation, ultrasonic sensors, radar sensors, light detection and ranging (LIDAR) sensors, cameras, microphones, inertial sensors (e.g., inertial measurement units, accelerometers, gyros, etc.), global positioning satellite (GPS) sensors, and the like.

Figure 3:
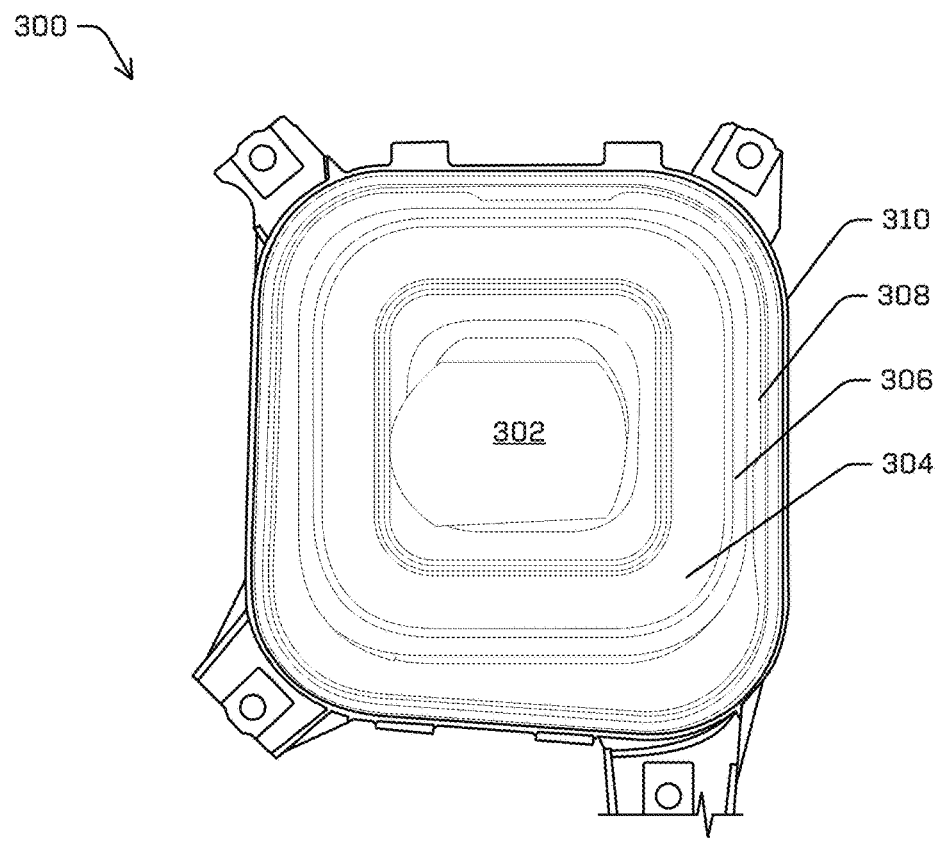
FIG. 3 is a front view of an example multi-functional light unit.

FIG. 3 is a schematic front view of an example light unit 300, which may be the same as or similar to light units 102 illustrated in FIGS. 1 and 2. Light unit 300 includes a white light source 302, and a first support structure 304 that includes various LED light sources corresponding to parking lights, direction indicator lights, brake lights, tail lights, and backup lights. White light source 302 may be configured to have particular optical characteristics, such as brightness, angular distribution of intensity, and color temperature, just to name a few examples. Such particular optical characteristics may be designed or determined based, at least in part, on one or more various (e.g., government) standards or regulations. For example, distribution of intensity (e.g., irradiance, illuminance, etc.) of various light output may be measured based on the distance standards or regulations. In some examples, such standards or regulations may set forth a distance of 3 meters or 1.2 meters, depending on the particular light function. In some examples, lower beam/upper beam headlights produced in part from white light source 302 may be measured at a distance of 18.3 meters.

White light source 302 need not be a semiconductor (e.g., LED) source, and instead may be an arc-type lamp, a halogen-type lamp, and so on. While white light source 302 is illustrated in FIG. 3 to have a particular shape, in other examples the white light source 302 and/or associated structure (e.g., housing, mirrors, reflectors, etc.) may have other shapes. For example, white light source 302 and/or other structure may be circular, square, symmetrical, a point source, an extended source, and so on. Light unit 300 also includes a second support structure 306 that includes optics positioned to be illuminated by the respective various LED light sources, as described below. Light unit 300 also includes a lens array 308 and an outer casing 310.

Figure 4:
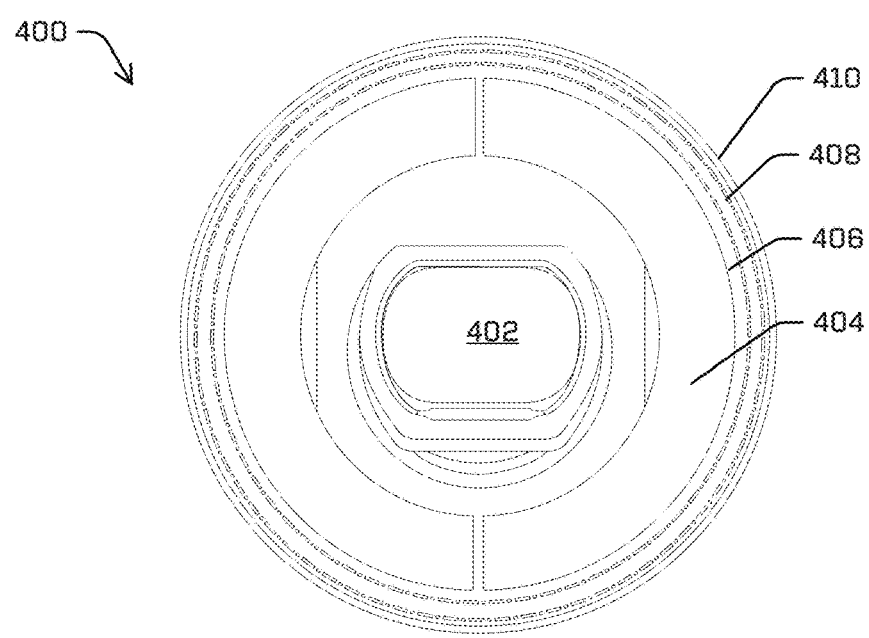
FIG. 4 is a front view of another example multi-functional light unit.

FIG. 4 is a schematic front view of another example light unit 400, which may be the same as or similar to light unit 300 except that light unit is substantially circular shaped while light unit 300 is substantially rectangular. Light unit 400 includes a white light source 402, and a first support structure 404 that includes various LED light sources corresponding to parking lights, direction indicator lights, brake lights, tail lights, and backup lights. White light source 402 need not be a semiconductor (e.g., LED) source, and instead may be an arc-type lamp, a halogen-type lamp, and so on. Light unit 400 also includes a second support structure 406 that includes optics positioned to be illuminated by the respective various LED light sources, as described below. Light unit 400 also includes a lens array 408 and an outer casing 410.

Figure 5:
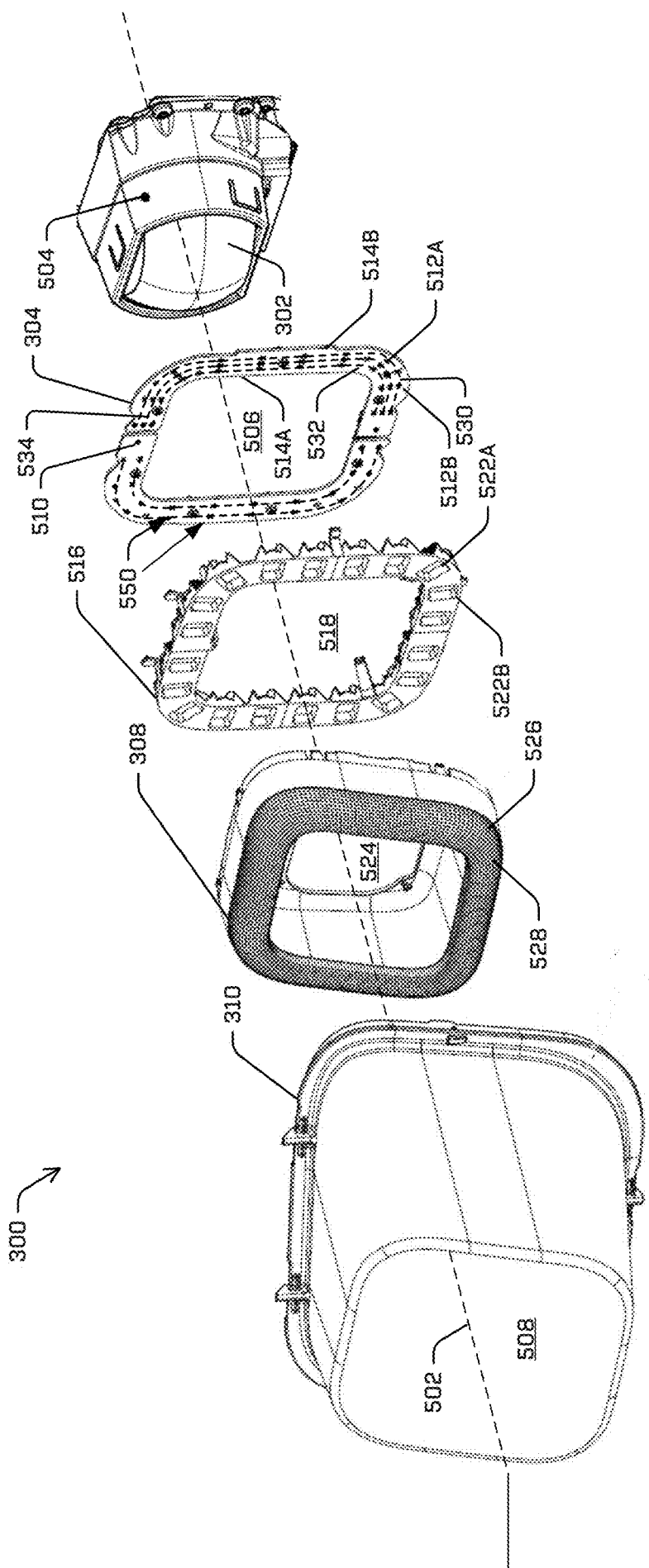
FIG. 5 is an exploded perspective view of an example multi-functional light unit.

FIG. 5 is an exploded perspective view of a portion of light unit 300, which may be located in or near any of quadrants Q1-Q4, illustrated in FIG. 2. Such an exploded perspective view may also be applied to light unit 400, which has components similar to those of light unit 300, except that such components are generally square shaped instead of round. In either case, such components may have any of a number of shapes.

An axis 502 is illustrated to indicate a central axial region of light unit 300. Herein, the term "central" is not limited to meaning at or of a center point or central area, but instead is used to indicate a general area or location that is substantially central as opposed to being at or near an edge, in the context of its use. A housing 504 supports white light source 302, used as a main headlight for the vehicle. White light source 302 may be substantially centered about axis 502 which, in some cases, may coincide with an optical axis of the white light source. In some implementations, white light source 302 may be in another location relative to first and second support structures, such as between the two support structures or between the second support structure and lens array 308, for example. In such implementations where the white light source is in front of (e.g., closer to lens array 308) a supporting structure, such supporting structure need not include a central opening, such as 506 or 518. Moreover, white light source 302 need not actually produce a particular broad spectrum white light and instead may produce a light spectrum comprising one or more visible light bands having a resulting emitted light equivalent to any color temperature (e.g., including a relatively high amount of "yellow" light or "blue" light). As mentioned above, white light source 302 may be configured to have particular optical characteristics, such as brightness and angular distribution of brightness, which may be designed or determined based, at least in part, on one or more various standards or regulations.

First support structure 304 may include central opening 506 that allows light from white light source 302 to pass and ultimately exit light unit 300 through an opening 508 in outer casing 310. First support structure 304 includes various LED light sources corresponding to various lighting functions such as parking lights, direction indicator lights, brake lights, tail lights, turn indicator lights, and backup lights, just to name a few examples. Such LED light sources may comprise single LEDs, such as LED light source 510, or groups of two or more LEDS, such as LED light sources 512A and 512B (e.g., three individual LEDs of light sources 512A and three individual LEDs of light sources 512B are illustrated in FIG. 5). LED light sources may comprise any number, color (e.g., red, white, amber, and so on), and/or type of individual LEDs. As illustrated, the LED light sources are in various locations along first support structure 304. In some implementations, the LED light sources are arranged concentrically along an inner periphery 514A and an outer periphery 514B of first support structure 304. In some examples, a first row 530 of LED light sources located along the inner periphery 514A may comprise white LEDs, and a second row 532 of LED light sources along the outer periphery 514B may comprise red LEDs, or vice versa. In some examples, a third row 534 of amber LED light sources may be disposed on at least a portion of the first support structure 304 and may be interposed between the first row 530 and the second row 532, may be inboard of the first row 530 or outboard of the second row 532. In some examples, the third row 534 of LED light sources may be disposed on only a portion of the first support structure 304 (e.g., a half of the support structure that is laterally outboard of the vehicle) and may be used as indicator lights. In other words, the LED light sources may be arranged asymmetrically or partially along the inner periphery 514A and/or outer periphery 514B of first support structure 304, such as for various indicator lights, so that such indicator lights don't form a full circle of illumination. Instead, such indicators lights may form, for example, a semicircle of illumination in a portion of the light unit. To help dissipate heat generated by the LEDs, first support structure 304 may be in thermal contact with a heat sink (not illustrated). In some implementations, first support structure 304 may be a printed circuit board (PCB) with circuitry for energizing the LEDs. In some implementations, first support structure 304 may comprise a single continuous structure, while in other implementations first support structure 304 may comprise two or more structures that are assembled into a ring-like configuration (e.g., having an opening similar to central opening 506).

Second support structure 516 may include a central opening 518 that allows light from white light source 302 to pass and ultimately exit light unit 300 through opening 508 in outer casing 310. Second support structure 516 includes various optical components 522 in various locations along the second support structure that correspond to respective LED light sources on first support structure 304 of the various lighting functions. In other words, each such optical component 522 corresponds to a particular LED light source by receiving light from that particular LED light source. Optical components 522 and their corresponding LED light sources are relatively near one another, separated by distances that may be based, at least in part, on optical characteristics of the LED light sources and the optical components themselves. For example, a particular LED may have an inherent focal length that is considered when determining where to locate a corresponding optical component on second support structure and at what distance from the LED. Such optical components may be lenses, diffusers, color filters, or polarizers, just to name a few examples. In particular, such optical components may operate on a principle of total internal reflection and may be called total-internal-reflection (TIR) optics (e.g., TIR lenses). For example, such optics may comprise lenses that reflect light on internal surfaces of the lenses. In some implementations, some or all of the optical components 522 may be molded into the material of second support structure 516 and may include optical coating materials (e.g., antireflection coatings, color filter coatings, and so on). In other implementations, some or all of the optical components may be connected onto second support structure 516. In some implementations, second support structure 516 may comprise a single continuous structure, while in other implementations second support structure 516 may comprise two or more structures that are assembled into a ring-like (e.g., having an opening similar to 518) configuration. In some implementations, second support structure 516 may be adjustable in rotation and/or translation relative to first support structure 304 so that optical performance can be optimized during or after fabrication of light unit 300.

As mentioned above, each optical component 522 corresponds to a particular LED light source on first support structure 304. To illustrate some examples, optical component 522A corresponds to LED light source 512A and optical component 522B corresponds to LED light source 512B.

Lens array 308 includes a central opening 524 that allows light from white light source 302 to pass and ultimately exit light unit 300 through opening 508 in outer casing 310. Lens array also includes sets of lenses, each such lens being referred to as a lenslet (e.g., a microlens). For example, such sets of lenses, or groups of lenslets, may be arranged in a fly's eye array configuration and may have optical properties or characteristics that may vary for different locations of the array. For example, a group of lenslets 526 may have optical properties or characteristics appropriate for corresponding optical component 522A and a group of lenslets 528 may have optical properties or characteristics appropriate for corresponding optical component 522B. Such lenslets or groups of lenslets may be "pillow"-shaped to produce a substantially uniform exit light or may have other lens-like properties to collimate light exiting from a corresponding optical component on second support structure 516. Moreover, lenslets or groups of lenslets may be substantially flat and clear (e.g., a window) to merely pass light from a corresponding optical component on second support structure 516. In some implementations, lenslets or groups of lenslets may at least partially comprise a material that diffuses light upon reflection or transmission. Such diffusion of light may lead to output from the light unit of light having a "soft" glow. Such a type of light may be particularly useful for giving a vehicle visibility, such as for indication lights (e.g., brake lights, turn indication lights, and so on) as opposed to illuminating the environment surrounding the vehicle (e.g., such as one of the functions of headlights and reverse lights). Diffused light from lenslets or groups of lenslets generally results in illumination (e.g., intensity or irradiance) that may be substantially uniform at various viewing angles. In some implementations, lens array 308 may be adjustable in rotation and/or translation relative to second support structure 516 so that optical performance can be optimized during or after fabrication of light unit 300.

Figure 6:
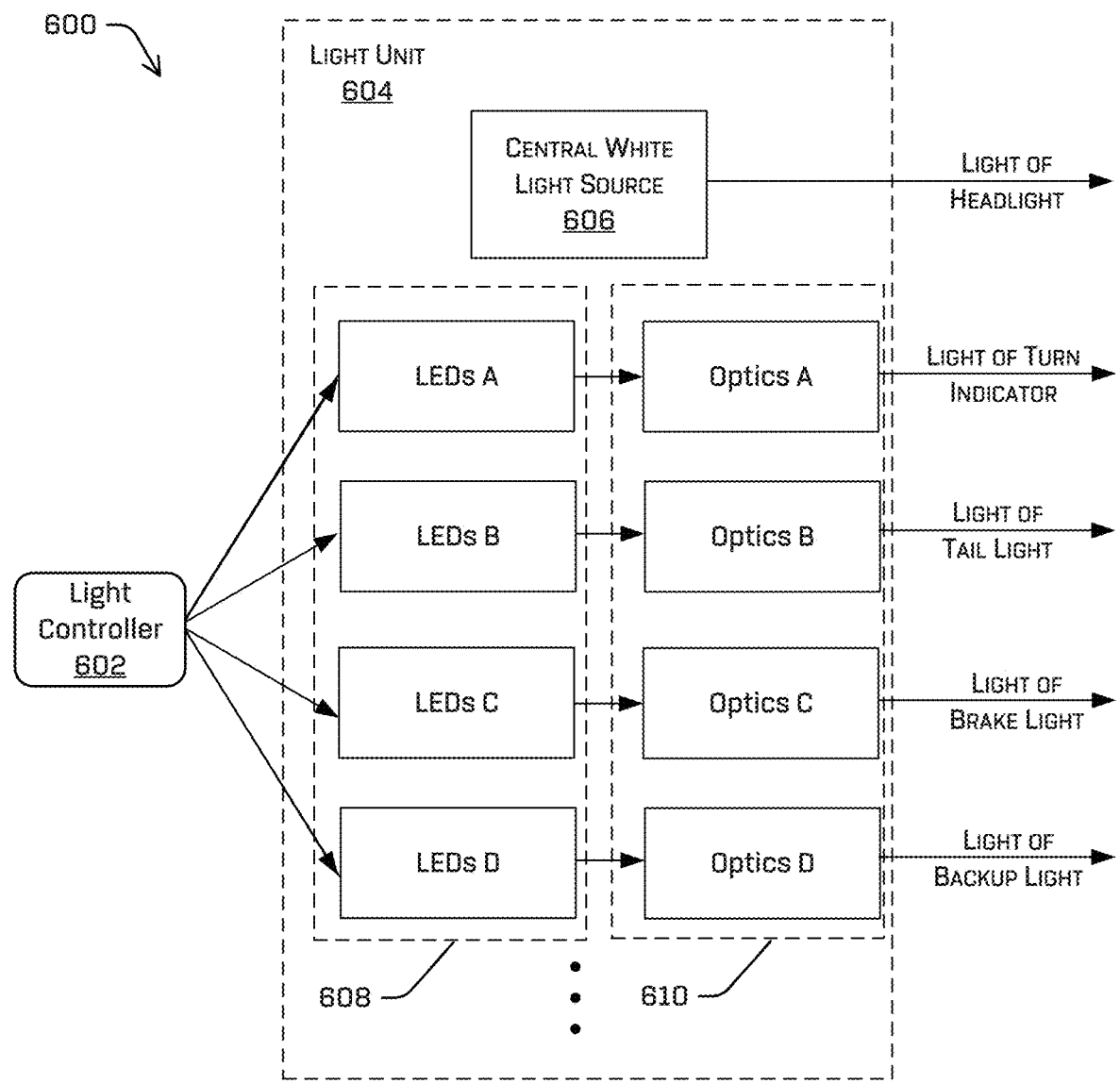
FIG. 6 is a block diagram illustrating functionality of various components of an example lighting system.

FIG. 6 is a block diagram illustrating functionality of various components of a portion of a lighting system 600 of a vehicle, such as vehicle 100. Lighting system includes a light controller 602 and a light unit 604. One light unit 604 is illustrated, though lighting system 600 may include multiple light units, such as 102A-D illustrated in FIG. 2. Light unit 604 includes a white light source 606, LED light sources 608, labelled as LEDs A-D, and optical components 610, labelled as Optics A-D. Light unit 604 may include any number of white light sources, LED light sources.

Light controller 602 is communicatively (e.g., electronically) coupled to light unit 604 to control white light source 606 and individual (or a combination of) LED light sources 608. In some implementations, light controller 602 may be communicatively coupled to one or more other light controllers, which in turn may be communicatively coupled to a vehicle controller that at least partially manages various operations of the vehicle. As discussed above, individual LED light sources correspond to different lighting functions, such as turn indicator lights, tail lights, brake lights, and backup lights, just to name a few examples. Moreover, the different LED light sources (e.g., 512A and 512B, and so on) correspond to respective different optics (e.g., optical components 522) of 610. For some examples, light controller 602 may operate LEDs A to illuminate optics A (e.g., which may produce amber or red light) to produce light for a turn indicator, light controller 602 may operate LEDs B to illuminate optics B to produce light for a tail light or brake (e.g., stop) light, light controller 602 may operate LEDs C to illuminate optics C to produce light for a daytime running light or parking light, and light controller 602 may operate LEDs D (e.g., which may produce white light) to illuminate optics D to produce light for a backup light. In addition, light controller 602 may activate white light source 606, which may comprise a light source and built-in optics, to produce light of a headlight (e.g., lower beam and upper beam headlight).

Figure 7:
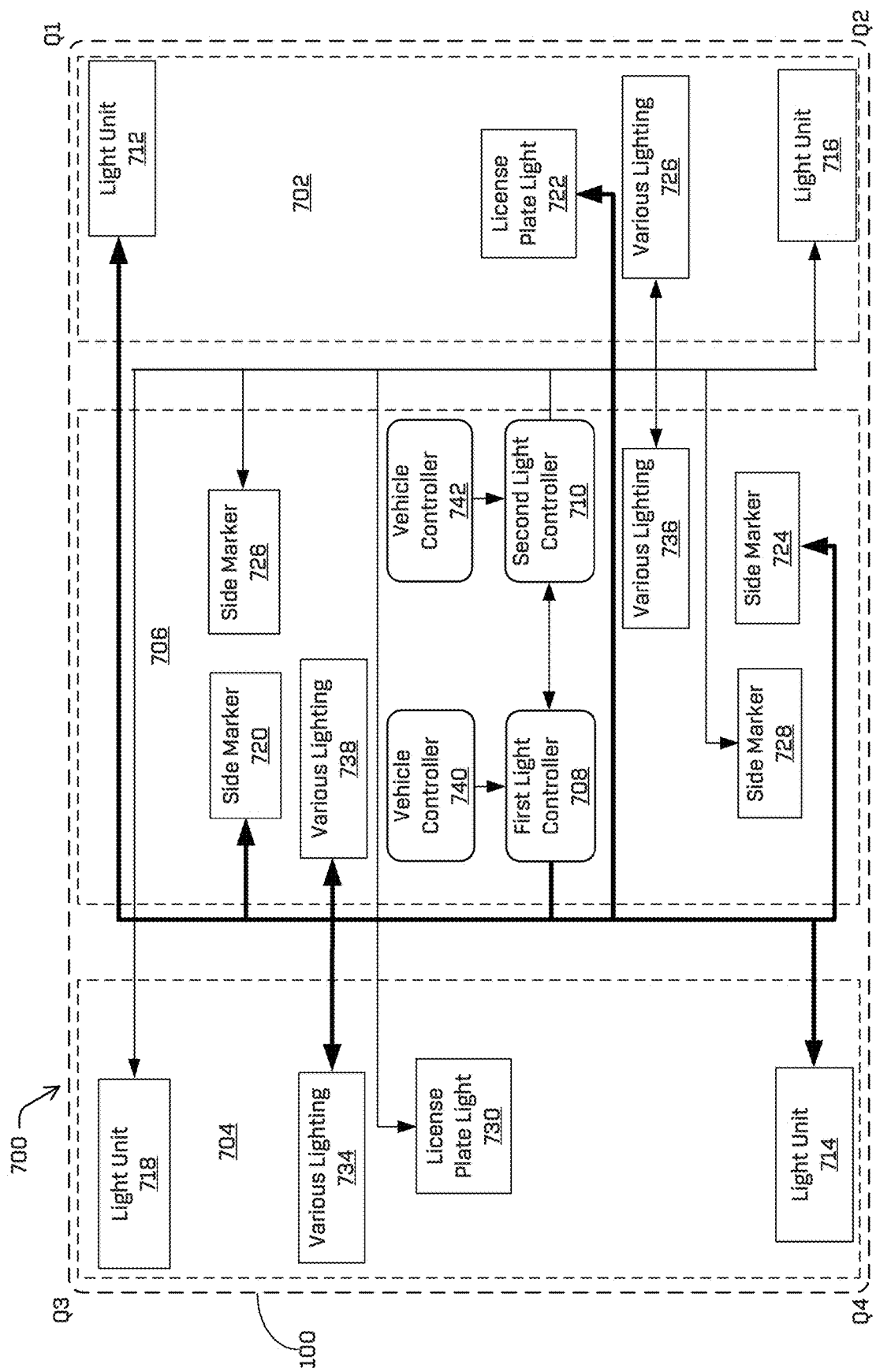
FIG. 7 is a block diagram illustrating an architecture of an example lighting system including multiple lighting controllers providing bidirectional redundancy.

FIG. 7 is a schematic diagram illustrating a lighting system 700 that includes various lights and controllers. For example, lighting system 700 may be similar to or the same as lighting system 600 and may be implemented on a bi-directional vehicle, such as vehicle 100, and quadrants Q1-Q4 are labelled as in FIG. 2. Lighting system 700 includes light controllers that are connected to various lights on the vehicle such that a portion of lights on one end of the vehicle are operated by one light controller while a portion of lights on the other end of the vehicle are operated by the other light controller. Such an interconnected configuration may allow for a degree of redundancy so that at least some lights are operable on either end of the vehicle, for the sake of visibility and safety. Physical and/or functional portions of vehicle 100 may be identified as a first drive module 702, a second drive module 704, and a body module 706. Considering such identification, a portion of lights are included in first drive module 702, another portion of lights are included in second drive module 704, while yet another portion of lights are included in body module 706, as described below.

Lighting system 700 includes a first light controller 708 and a second light controller 710 (the designations "first" and "second" are generally interchangeable). First light controller 708 and second light controller 710, while both being located in body module 706 in this example, may be spatially separated so that second light controller 710 is closer than first light controller 708 to a first end (e.g., that includes quadrants Q1 and Q2) of the vehicle. In other examples, the first light controller 708 and second light controller 710 may be disposed in or on the first drive module 702 and second drive module 704, respectively. Lighting system 700 includes lights as illustrated in FIG. 7. In particular, first light controller 708 is configured to operate a light unit 712, located on the first end of the vehicle, and a light unit 714 located on a second end (e.g., that includes quadrants Q3 and Q4), opposite the first end, of the vehicle. Such light units, similar to or the same as light unit 604, include a relatively bright white light having a relatively long throw (e.g., to sufficiently illuminate a scene in front of the vehicle) and other light functionality such as brake lights, backup lights, and so on, as described above. On the other hand, second light controller 710 is configured to operate a light unit 716, located on the first end of the vehicle, and a light unit 718 located on the second end of the vehicle. Thus, if, for example, second light controller 710 fails to properly operate, first light controller 708 is available to operate light unit 712 on the first end of the vehicle or light unit 714 located on the second end of the vehicle. Accordingly, there is an operable light on each end of the vehicle, even in the case of a light controller failure. Similarly, if first light controller 708 fails to properly operate, second light controller 710 is available to operate light unit 716 on the first end of the vehicle or light unit 718 located on the second end of the vehicle. Again, there is an operable light on each end of the vehicle, even in the case of a light controller failure.

By way of example and not limitation, vehicle 100, as mentioned above, may include body module 706, first drive module 702 coupled to a first end of the body module, and second drive module 704 coupled to a second end of the body module. First light controller 708 may be mounted on or coupled to the first end of body module 706 and second light controller 710 may be mounted on or coupled to the second end of body module 706. First light controller 708 may be spatially separated from second light controller 710. For example, first light controller 708 may be disposed closer to the first end of the vehicle than to the second end of the vehicle, and second light controller 710 may be disposed closer to the second end of the vehicle than to the first end of the vehicle.

First light controller 708 is also configured to operate lights on or near the first end of the vehicle, such as a side marker light 720, and license plate light 722, and to operate lights on or near the second end of the vehicle, including a side marker light 724. Second light controller 710 is also configured to operate lights on or near the first end of the vehicle, including a side marker light 726, and to operate lights on or near the second end of the vehicle, including a side marker light 728, and license plate light 730. First light controller 708 is configured to operate various lighting 732 (e.g., exterior and interior lights) located in or on various parts of body module 706 and to operate various lighting 734 (e.g., exterior and interior lights) located in or on various parts of second drive module 704. Second light controller 710 is configured to operate various lighting 736 (e.g., exterior and interior lights) located in or on various parts of body module 706 and to operate various lighting 738 (e.g., exterior and interior lights) located in or on various parts of first drive module 702.

To illustrate a particular example, lighting system 700 may include light units 712 and 716 on the first end of vehicle 100 and light units 714 and 718 on the second end of the vehicle. Each of the light units is configured to function as a headlight and a tail light, as described above. First light controller 708, being communicatively coupled to light units 712 and 714, is configured to operate light unit 712 to function as a headlight while operating light unit 714 to function as a tail light. This may be the case if the vehicle's leading (front) end is the first end. Alternatively, if the vehicle's leading (front) end is the second end, first light controller 708 is configured to operate light unit 712 to function as a tail light while operating light unit 714 to function as a headlight. Second light controller 710, being communicatively coupled to light units 716 and 718, is configured to operate light unit 716 to function as a headlight while operating light unit 718 to function as a tail light. This may be the case if the vehicle's leading (front) end is the first end. Alternatively, if the vehicle's leading (front) end is the second end, second light controller 710 is configured to operate light unit 716 to function as a tail light while operating light unit 718 to function as a headlight.

In some implementations, each light controller 708 and 710 can operate light units in a diagonal configuration with respect to the vehicle (e.g., in a top view of the vehicle). For example, light unit 712 and light unit 714 may be disposed diagonally from one another, as illustrated, and light unit 716 and light unit 718 may also be disposed diagonally from one another. In other implementations, each light controller 708 and 710 can operate light units that are on a same lateral side of the vehicle. For example, light unit 712 and light unit 718 may be disposed on the same lateral side as each other, counter to what is illustrated in FIG. 7, and light unit 716 and light unit 714 may be disposed on the same lateral side as each other.

In some example implementations, lighting system 700 may include light unit 712 on a first end of a vehicle as identified by quadrants Q1 and Q2. Light unit 712 may comprise a first light source operable as a headlight and a second light source operable as a tail light, for instance. Lighting system 700 may further include light unit 714 on a second end of the vehicle as identified by quadrants Q3 and Q4. Light unit 714 may comprise a third light source operable as a headlight and a fourth light source operable as a tail light. First light controller 708 may be communicatively coupled to light unit 712 and light unit 714. First light controller 708 may be configured to control light unit 712 to illuminate the first light source operable as the headlight and light unit 714 to illuminate the fourth light source operable as the tail light when the first end of the vehicle is a leading end (e.g., when the vehicle is moving such that quadrants Q1 and Q2 are leading quadrants Q3 and Q4). First light controller may also be configured to control light unit 712 to illuminate the second light source operable as the tail light and light unit 714 to illuminate the third light source operable as the headlight when the second end of the vehicle is the leading end (e.g., when the vehicle is moving such that quadrants Q3 and Q4 are leading quadrants Q1 and Q2).

In some implementations, first light controller 708 may be communicatively coupled to second light controller 710. A vehicle controller 740 may provide control signals to first light controller 708 and another vehicle controller 742 may provide control signals to second light controller 710. In some examples, vehicle controller 740 may be an EMU, such as that mentioned above, while vehicle controller 742 may be a secondary or backup EMU, both being connected to various electrical and mechanical components of the vehicle via a suitable communications network. Vehicle controller 740 and vehicle controller 742 may provide control signals responsive to which direction the vehicle is travelling. Vehicle controller 740 and vehicle controller 742 may provide redundant signals when operating properly. Accordingly, if one vehicle controller fails to function properly, the other vehicle controller may provide control signals to either first light controller 708 or second light controller 710.

Figure 8:
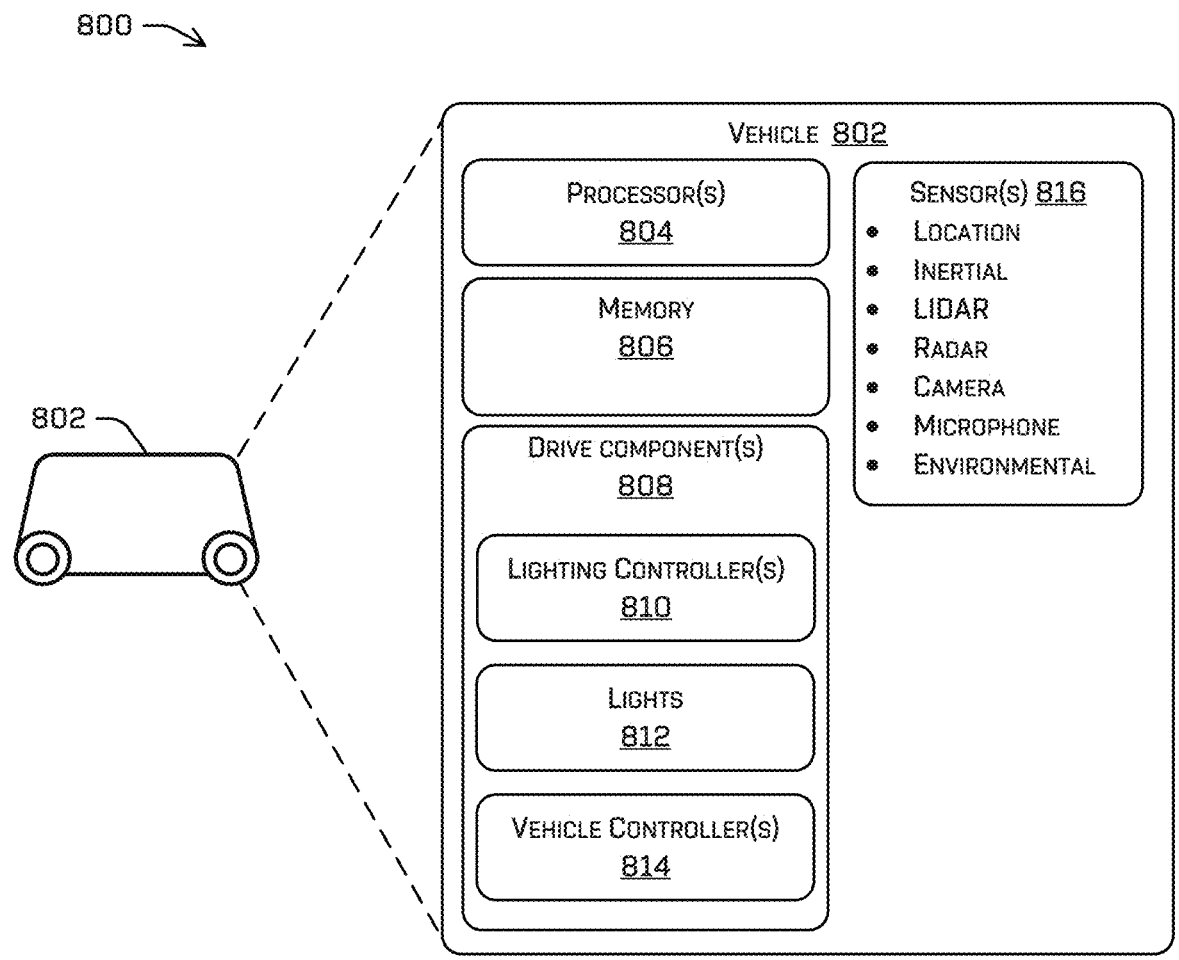
FIG. 8 is a block diagram of an example system for implementing multi-function light units, control systems, and techniques as described herein.

FIG. 8 is a block diagram of a system 800 including an example vehicle 802 for implementing light units, as described herein. System may be configured to control operation of the vehicle, which may be an autonomous vehicle, and to control various lighting functions.

In some examples, system 800 may include processor(s) 804 and/or memory 806. These elements are illustrated in combination in FIG. 8, although it is understood that they may be separate elements of system 800, and that components of the system may be implemented as hardware and/or software, in some examples.

Processor(s) 804 may include a uniprocessor system including one processor, or a multiprocessor system including several processors (e.g., two, four, eight, or another suitable number). Processor(s) 804 may be any suitable processor capable of executing instructions. For example, in various implementations, processor(s) 804 may be general-purpose or embedded processors implementing any of a variety of instruction set architectures (ISAs), such as the x86, PowerPC, SPARC, or MIPS ISAs, or any other suitable ISA. In multiprocessor systems, each processor 804 may commonly, but not necessarily, implement the same ISA. In some examples, the processor(s) 804 may include a central processing unit (CPU), a graphics processing unit (GPU), FPGA, Application Specific Integrated Circuit (ASIC), or a combination thereof. In some examples, the classifier and/or one or more of the detectors discussed herein may be implemented using any of these processor architectures. For example, the classifier and/or the one or more detectors may be FPGAs.

System 800 may include memory 806. In some examples, memory 806 may include a non-transitory computer readable media configured to store executable instructions/modules, data, and/or data items accessible by processor(s) 804. In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory computer readable media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to system 800. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via network interface(s), for example.

Furthermore, though illustrated as a single unit in FIG. 8, it is understood that processor(s) 804 and memory 806 may be distributed among multiple computing devices of the vehicle and/or among multiple vehicles, data centers, teleoperation centers, etc. In some examples, processor(s) 804 and memory 806 may conduct at least some of the techniques discussed herein.

System 800 may include network interface(s) configured to establish a communication link (i.e., "network") between the system and one or more other devices. In various implementations, the network interface(s) may support communication via wireless general data networks, such as a Wi-Fi network, and/or telecommunications networks, such as, for example, cellular communication networks, satellite networks, and the like. In some examples, sensor data, such as a received signal, TDOA, depth measurement, output signal(s), return(s), and/or detection(s), etc., may be received at a first vehicle and transmitted to a second computing device. In some examples, at least some of the components of the LIDAR may be located at different devices. For example, a first vehicle may include the light emitter and light sensor and may generate the received signal but may transmit the received signal to a second vehicle and/or remote computing device.

System 800 may include one or more drive components 808. In some instances, the vehicle may have a single drive component. In some instances, drive component(s) 808 may include one or more sensors to detect conditions of drive component(s) 808 and/or the surroundings of the vehicle. Drive component(s) 808 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Drive component(s) 808 may include a light controller 810 and lights 812. Light controller 810 may comprise one or more individual light controllers (e.g., first light controller 708 and second light controller 710). Light controller 810 may be communicatively coupled to one or more other light controllers, which in turn may be communicatively coupled to a vehicle controller 814 that at least partially manages various operations of the vehicle. For example, vehicle controller 814 may be similar to or the same as either of vehicle controllers 740 or 742 illustrated in FIG. 7. Lights 812 may comprise one or more light units that are the same as or similar to any or all of light units 712-718. Lights 812 may also comprise various other lighting, such as license plate lights, side marker lights, and so on. Lighting of vehicle 802 may be configured to operate in a fashion that allows for lighting redundancy on each end of the vehicle, as described above. Accordingly, in some implementations, control of lights of vehicle 802 may be shared among two or more such light controllers. For example, some lights of the vehicle may be controlled by a first light controller while other lights of the vehicle may be controlled by a second light controller. In particular, and as described above, a first light controller may operate a light unit on each end of the vehicle and a second light controller may operate other light units on each end of the vehicle. Thus, if one of the light controllers fails to properly operate its respective light units, the other (properly functioning) light controller can ensure that at least one light unit on each end of the vehicle remains operable. While some examples herein show use of two light controllers, in other examples, three, four, or more light controllers could be used.

Additionally, drive component(s) 808 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of drive component(s) 808. Furthermore, drive component(s) 808 may also include one or more communication connection(s) that enable communication by the respective drive component with one or more other local or remote computing device(s).

System 800 may include sensor(s) 816, for example, configured to localize the vehicle in an environment, to detect one or more objects in the environment, to sense movement of the vehicle through its environment, sense environmental data (e.g., ambient temperature, pressure, and humidity), and/or sense conditions of an interior of the vehicle (e.g., passenger count, interior temperature, noise level). Sensor(s) 816 may include, for example, one or more LIDAR sensors, one or more cameras (e.g. RGB-cameras, intensity (grey scale) cameras, infrared cameras, depth cameras, stereo cameras), one or more magnetometers, one or more radar sensors, one or more sonar sensors, one or more microphones, one or more inertial sensors (e.g., accelerometers, gyroscopes), one or more GPS sensors, one or more wheel encoders, one or more drive system sensors, a speed sensor, and/or other sensors related to the operation of the vehicle.

EXAMPLE CLAUSES

While the example clauses described above are described with respect to one particular implementation, it should be understood that, in the context of this document, the content of the example clauses can also be implemented via a method, device, system, and/or computer-readable medium.

A. An example multi-function light unit can switch between functioning as a headlight and functioning as a tail light. One or more multi-function light units can be disposed on each of a first end and a second end of a vehicle, such as but not limited to a bidirectional vehicle. Each multi-function light unit can include optics and light sources to perform the functions of both headlights and tail lights. Each light unit can change its functions (e.g., between a headlight and a tail light), based on a direction of travel of the vehicle.

B. An example light unit configured to operate as a headlight or a tail light for a vehicle comprises: a headlight light source; a first light source corresponding to a backup light; a second light source corresponding to a brake light; first optics positioned to be illuminated by the first light source and second optics positioned to be illuminated by the second light source; and a lens array positioned to receive light from the first light source and the second light source, the lens array including: a first portion having a first set of lenses having first characteristics to operate as the first optics; and a second portion having a second set of lenses having second characteristics to operate as the second optics.

C. The example light unit of example B, further comprising: a first support structure having a first central opening that allows light from the headlight light source to pass, the first supporting structure including the first light source and the second light source; and a second support structure having a second central opening that allows the light from the headlight light source to pass, the second supporting structure including first optics positioned to be illuminated by the first light source and second optics positioned to be illuminated by the second light source.

D. The example light unit of any one of examples B or C, wherein the first support structure further includes a third light source; the second support structure further includes third optics positioned to be illuminated by the third light source corresponding to a turn signal light, wherein the third optics, in response to receiving light from the third light source, are configured to illuminate a first peripheral region of the light unit.

E. The example light unit of any one of examples B-D, wherein the first light source comprises one or more white light emitting diodes (LEDs), the second light source comprises one or more red LEDs, and the third light source comprises one or more amber LEDs.

F. The example light unit of any one of examples B-E, wherein the portion of the first optics comprises multiple lenses that reflect light on internal surfaces of the lenses, and the portion of the second optics comprises multiple lenses that reflect light on internal surfaces of the lenses.

G. An example method comprising: receiving, in response to a vehicle travelling in a first direction, a first signal to cause a first light source to emit light corresponding to a headlight of the vehicle; and receiving, in response to the vehicle travelling in a direction opposite the first direction, a second signal to cause a second light source to emit light corresponding to a tail light of the vehicle, and a third signal to cause a third light source to emit light corresponding to a brake light of the vehicle, wherein the second light source and the third light source are located on a first support structure that is adjacent to a second support structure that includes a portion of first optics positioned to be illuminated by the second light source and a portion of second optics positioned to be illuminated by the third light source.

H. The example method of example G, further comprising: receiving, in response to the vehicle travelling in the direction opposite the first direction, a third signal to cause a third light source to emit light corresponding to a backup light of the vehicle.

I. The example method of any one of examples G or H, wherein the second support structure is adjacent to a lens array positioned to receive light from the second light source and the third light source, the lens array including: a first portion having a first set of lenses having first characteristics to provide the first optics; and a second portion having a second set of lenses having second characteristics to provide the second optics, the second characteristics being different than the first.

J. The example method of any one of examples G-I, wherein the first set of lenses includes a first particular quantity and distribution of light diffusing material or surfaces, and the second set of lenses includes a second particular quantity and distribution of light diffusing material or surfaces different than the first particular quantity and distribution of light diffusing material or surfaces.

K. The example method of any one of examples G-J, wherein the first characteristics include a first focal length to produce a first intensity distribution of light for the tail light of the vehicle.

L. The example method of any one of examples G-K, wherein the second characteristics include a second focal length to produce a second intensity distribution of light for the brake light of the vehicle.

M. The example method of any one of examples G-L, wherein the first light source comprises a white light source and the second light source comprises one or more red light emitting diodes (LEDs).

N. The example method of any one of examples G-M, wherein the portion of the first optics and the portion of the second optics comprise lenses that reflect light on internal surfaces of the lenses.

O. An example light unit comprises: a first light source configured to emit a first color of light in accordance with a first signal; a second light source configured to emit a second color of light in accordance with a second signal; a first support structure that includes the first light source and the second light source; a second support structure that includes a portion of first optics positioned to be illuminated by the first light source and a portion of second optics positioned to be illuminated by the second light source; and a lens array positioned to receive light from the first light source and the second light source, the lens array including: a first portion having a first set of lenses having first characteristics to operate as the first optics; and a second portion having a second set of lenses having second characteristics to operate as the second optics.

P. The example light source of example O, wherein the first set of lenses includes a first particular quantity and distribution of light diffusing material or surfaces, and the second set of lenses includes a second particular quantity and distribution of light diffusing material or surfaces different than the first particular quantity and distribution of light diffusing material or surfaces.

Q. The example light source of any one of examples O or P, wherein the portion of the first optics and the portion of the second optics comprise lenses that reflect light on internal surfaces of the lenses.

R. The example light source of any one of examples O-Q, wherein the first support structure further includes a third light source; the second support structure further includes: a portion of third optics positioned to be illuminated by the third light source; and the third optics, in response to receiving light from the third light source, are configured to illuminate a first peripheral region of each of the first light unit and the second light unit.

S. The example light source of any one of examples O-R, wherein the first light source comprises one or more white light emitting diodes (LEDs), the second light source comprises one or more red LEDs, and the third light source comprises one or more amber LEDs.

T. The example light source of any one of examples O-S, wherein the first signal is indicative of a first direction of travel of a vehicle on which the light unit is mounted, and wherein the second signal is indicative of a second direction of travel opposite the first direction of travel.

U. The example light source of any one of examples O-T, wherein the first color of light is amber and the first signal comprises a turn indicator signal.

V. In some examples, system-wide control of vehicle lights may be performed by two separate controllers that offer redundancy in the event of failure of one of the controllers. The system-wide control may be directed to front and rear lighting functionality in single light units. Each light controller may control lights on first and second ends of the vehicle. In addition, some of the light units may include optics and positioning of light sources to implement multiple light functions, such as in the case of the example multi-function light unit of example A.

W. An example vehicle system comprises: a first light unit on a first end of a vehicle; a second light unit on the first end of the vehicle; a third light unit on a second end of the vehicle; a fourth light unit on the second end of the vehicle, wherein each of the first, second, third, and fourth light units is configured to function as a headlight and a tail light; a first light controller communicatively coupled to the first light unit and the third light unit and configured to: operate the first light unit on the first end of the vehicle to function as a headlight while operating the third light unit on the second end of the vehicle to function as a tail light; or operate the first light unit on the first end of the vehicle to function as a tail light while operating the third light unit on the second end of the vehicle to function as a headlight; and a second light controller communicatively coupled to the second light unit and the fourth light unit and configured to: operate the second light unit on the first end of the vehicle to function as a headlight while operating the fourth light unit on the second end of the vehicle to function as a tail light; or operate the second light unit on the first end of the vehicle to function as a tail light while operating the fourth light unit on the second end of the vehicle to function as a headlight.

X. The example vehicle system of example W, wherein the first light unit and the fourth light unit are disposed on a first lateral side of the vehicle, and the second light unit and the third light unit are disposed on a second lateral side of the vehicle opposite the first lateral side.

Y. The example vehicle system of any one of examples W or X, wherein the first light unit and the third light unit are disposed on a first lateral side of the vehicle, and the second light unit and the fourth light unit are disposed on a second lateral side of the vehicle opposite the first lateral side.

Z. The example vehicle system of any one of examples W-Y, wherein: the first light controller is configured to operate to control the first light unit and the third light unit during a failure of the second light controller to properly operate; and the second light controller is configured to operate to control the second light unit and the fourth light unit during a failure of the first light controller to properly operate.

AA. The example vehicle system of any one of examples W-Z, wherein responsive to the failure of the first light controller to properly operate, the second light controller is configured to operate the second light unit on the first end of the vehicle to function as the headlight while operating the fourth light unit on the second end of the vehicle to function as the tail light; and responsive to the failure of the second light controller to properly operate, the first light controller is configured to operate the first light unit on the first end of the vehicle to function as the headlight while operating the third light unit on the second end of the vehicle to function as the tail light.

BB. The example vehicle system of any one of examples W-AA, further comprising a first set of exterior lights and a second set of exterior lights, wherein the first light controller is further configured to operate the first set of exterior lights and the second light controller is further configured to operate the second set of exterior lights.

CC. An example method comprises: operating, using a first light controller, a first light unit on a first end of a vehicle to function as a headlight while operating a second light unit on a second end of the vehicle to function as a tail light; and operating, using the first light controller, the first light unit on the first end of the vehicle to function as a tail light while operating the second light unit on the second end of the vehicle to function as a headlight; and operating, using a second light controller, a third light unit on the first end of a vehicle to function as a headlight while operating a fourth light unit on the second end of the vehicle to function as a tail light; and operating, using the second light controller, the third light unit on the first end of the vehicle to function as a tail light while operating the fourth light unit on the second end of the vehicle to function as a headlight.

DD. The example method of example CC, wherein the first light unit and the fourth light unit are disposed on a first lateral side of the vehicle, and the second light unit and the third light unit are disposed on a second lateral side of the vehicle opposite the first lateral side.

EE. The example method of any one of examples CC or DD, wherein the first light unit and the second light unit are disposed on a first lateral side of the vehicle, and the third light unit and the fourth light unit are disposed on a second lateral side of the vehicle opposite the first lateral side.

FF. The example method of any one of examples CC-EE, wherein: the first light controller operates independently of the second light controller.

GG. The example method of any one of examples CC-FF, further comprising: in response to a failure of the first light controller to properly operate, the second light controller is configured to operate the second light unit on the first end of the vehicle to function as the headlight while operating the fourth light unit on the second end of the vehicle to function as the tail light; and responsive to the failure of the second light controller to properly operate, the first light controller is configured to operate the first light unit on the first end of the vehicle to function as the headlight while operating the third light unit on the second end of the vehicle to function as the tail light.

HH. The example method of any one of examples CC-GG, wherein the first light controller operates a first set of license plate lights and side marker lights and the second light controller operates a second set of license plate lights and side marker lights.

II. The example method of any one of examples CC-HH, wherein the first light controller is spatially separated from the second light controller.

JJ. The example method of any one of examples CC-II, further comprising operating, using the first light controller, the second light unit on the second end of the vehicle to function as a brake light while operating the first light unit on the first end of the vehicle to function as the headlight.

KK. An example non-transitory computer-readable medium may store instructions that, when executed, cause one or more processors to perform operations comprising: managing a first light controller that is configured to: operate a first light unit on a first end of a vehicle to function as a headlight while operating a second light unit on a second end of the vehicle to function as a tail light; and operate the first light unit on the first end of the vehicle to function as a tail light while operating the second light unit on the second end of the vehicle to function as a headlight; and managing a second light controller that is configured to: operate a third light unit on the first end of a vehicle to function as a headlight while operating a fourth light unit on the second end of the vehicle to function as a tail light; and operate the third light unit on the first end of the vehicle to function as a tail light while operating the fourth light unit on the second end of the vehicle to function as a headlight.

LL. The example non-transitory computer-readable medium of example KK, wherein the first light unit and the fourth light unit are disposed on a first lateral side of the vehicle, and the second light unit and the third light unit are disposed on a second lateral side of the vehicle opposite the first lateral side.

MM. The example non-transitory computer-readable medium of any one of examples KK or LL, wherein the first light controller is independent of the second light controller.

NN. The example non-transitory computer-readable medium of any one of examples KK-MM, wherein responsive to the vehicle travelling with the first end of the vehicle as a leading end and the second end of the vehicle as a trailing end, the operations further comprise: managing the first light controller to operate the first light unit on the first end of the vehicle to function as the headlight while operating the second light unit on the second end of the vehicle to function as the tail light; and managing the second light controller to operate the third light unit on the first end of the vehicle to function as the headlight while operating the fourth light unit on the second end of the vehicle to function as the tail light, and wherein responsive to the vehicle changing direction so that the vehicle is travelling with the second end of the vehicle as a leading end and the first end of the vehicle as a trailing end: managing the first light controller to operate the first light unit on the first end of the vehicle to function as the tail light while operating the third light unit on the second end of the vehicle to function as the headlight; and managing the second light controller to operate the second light unit on the first end of the vehicle to function as the tail light while operating the fourth light unit on the second end of the vehicle to function as the headlight.

OO. The example non-transitory computer-readable medium of any one of examples KK-NN, wherein the operations further comprise managing the first light controller to operate the first set of exterior lights and managing the second light controller to operate the second set of exterior lights.

PP. The example non-transitory computer-readable medium of any one of examples KK-OO, wherein the operations further comprise operating the second light unit on the second end of the vehicle to function as a brake light operating the first light unit on the first end of the vehicle to function as the headlight.

While the example clauses described above are described with respect to particular implementations, it should be understood that, in the context of this document, the content of the example clauses can also be implemented via a method, device, system, a computer-readable medium, and/or another implementation. Additionally any of examples A-PP may be implemented alone or in combination with any other one or more of the examples A-PP.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples. It is to be understood that other examples can be used and that changes or alterations, such as structural changes, can be made. Such examples, changes or alterations are not necessarily departures from the scope with respect to the intended subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A light unit configured to operate as a headlight or a tail light for a vehicle, the light unit comprising:
   a headlight light source;
   a first light source corresponding to a backup light;
   a second light source corresponding to a brake light;
   first optics positioned to be illuminated by the first light source and second optics positioned to be illuminated by the second light source; and
   a lens array positioned to receive light from the first light source and the second light source, the lens array including:
      a first portion having a first set of lenses having first characteristics to operate as the first optics; and
      a second portion having a second set of lenses having second characteristics to operate as the second optics.

2. The light unit of claim 1, further comprising:
   a first support structure having a first central opening that allows light from the headlight light source to pass, the first supporting structure including the first light source and the second light source; and
   a second support structure having a second central opening that allows the light from the headlight light source to pass, the second supporting structure including first optics positioned to be illuminated by the first light source and second optics positioned to be illuminated by the second light source.

3. The light unit of claim 2, wherein
   the first support structure further includes a third light source;
   the second support structure further includes third optics positioned to be illuminated by the third light source corresponding to a turn signal light, wherein the third optics, in response to receiving light from the third light source, are configured to illuminate a first peripheral region of the light unit.

4. The light unit of claim 3, wherein the first light source comprises one or more white light emitting diodes (LEDs), the second light source comprises one or more red LEDs, and the third light source comprises one or more amber LEDs.

5. The light unit of claim 1, wherein:
   the first portion comprises multiple lenses that reflect light on internal surfaces of the lenses, and
   the second portion comprises multiple lenses that reflect light on internal surfaces of the lenses.

6. A light unit comprising:
   a first light source configured to emit a first color of light in accordance with a first signal;
   a second light source configured to emit a second color of light in accordance with a second signal;
   a first support structure that includes the first light source and the second light source;
   a second support structure that includes a portion of first optics positioned to be illuminated by the first light source and a portion of second optics positioned to be illuminated by the second light source; and a lens array positioned to receive light from the first light source and the second light source, the lens array including:
  a first portion having a first set of lenses having first characteristics to operate as the first optics; and
  a second portion having a second set of lenses having second characteristics to operate as the second optics.

7. The light unit of claim 6, wherein the first set of lenses includes a first particular quantity and distribution of light diffusing material or surfaces, and the second set of lenses includes a second particular quantity and distribution of light diffusing material or surfaces different than the first particular quantity and distribution of light diffusing material or surfaces.

8. The light unit of claim 6, wherein the portion of the first optics and the portion of the second optics comprise lenses that reflect light on internal surfaces of the lenses.

9. The light unit of claim 6, wherein
  the first support structure further includes a third light source;
  the second support structure further includes:
    a portion of third optics positioned to be illuminated by the third light source; and
    the third optics, in response to receiving light from the third light source, are configured to illuminate a peripheral region of the light unit.

10. The light unit of claim 9, wherein the first light source comprises one or more white light emitting diodes (LEDs), the second light source comprises one or more red LEDs, and the third light source comprises one or more amber LEDs.

11. The light unit of claim 6, wherein the first signal is indicative of a first direction of travel of a vehicle on which the light unit is mounted, and
  wherein the second signal is indicative of a second direction of travel opposite the first direction of travel.

12. The light unit of claim 6, wherein the first color of light is amber and the first signal comprises a turn indicator signal.

13. A vehicle comprising:
  a vehicle body; and
  a light unit disposed proximate a longitudinal end of the vehicle body, the light unit comprising:
    a first light source configured to emit a first color of light in accordance with a first signal;
    a second light source configured to emit a second color of light in accordance with a second signal;
    a first support structure that includes the first light source and the second light source;
    a second support structure that includes a portion of first optics positioned to be illuminated by the first light source and a portion of second optics positioned to be illuminated by the second light source; and
    a lens array positioned to receive light from the first light source and the second light source, the lens array including:
      a first portion having a first set of lenses having first characteristics to operate as the first optics; and
      a second portion having a second set of lenses having second characteristics to operate as the second optics.

14. The vehicle of claim 13, wherein the first set of lenses includes a first particular quantity and distribution of light diffusing material or surfaces, and the second set of lenses includes a second particular quantity and distribution of light diffusing material or surfaces different than the first particular quantity and distribution of light diffusing material or surfaces.

15. The vehicle of claim 13, wherein the portion of the first optics and the portion of the second optics comprise lenses that reflect light on internal surfaces of the lenses.

16. The vehicle of claim 13, wherein
  the first support structure further includes a third light source;
  the second support structure further includes:
    a portion of third optics positioned to be illuminated by the third light source; and
    the third optics, in response to receiving light from the third light source, are configured to illuminate a peripheral region of the light unit.

17. The vehicle of claim 16, wherein the first light source comprises one or more white light emitting diodes (LEDs), the second light source comprises one or more red LEDs, and the third light source comprises one or more amber LEDs.

18. The vehicle of claim 13, wherein the first signal is indicative of a first direction of travel of the vehicle on which the light unit is mounted, and
  wherein the second signal is indicative of a second direction of travel opposite the first direction of travel.

19. The vehicle of claim 13, wherein the first color of light is amber and the first signal comprises a turn indicator signal.

20. The vehicle of claim 13, wherein the light unit is a first light unit and is disposed proximate a first longitudinal end of the vehicle body, the vehicle further comprising:
  a second light unit disposed proximate a second longitudinal end of the vehicle body opposite the first longitudinal end, the second light unit being substantially identical to the first light unit; and
  a lighting controller configured to:
    in a first mode, control the first light unit to operate as a headlight for the vehicle while controlling the second light unit to operate as a tail light for the vehicle; and
    in a second mode, control the second light unit to operate as a headlight for the vehicle while controlling the first light unit to operate as a tail light for the vehicle.

* * * * *